Patented June 26, 1945

2,379,234

UNITED STATES PATENT OFFICE 2,379,234

SOLDERING FLUXES

Oskar Horowitz, Brooklyn, N. Y., assignor to Shanda Laboratories Incorporated, West New York, N. J., a corporation of New Jersey No Drawing. Application July 8, 1943, Serial No. 493,865

1 Claim. (Cl. 148—26)

This invention relates to soldering and soldering fluxes and to means and methods for fluxing solders on metals and more particularly to zinc and/or ammonium chloride fluxes in combination with small amounts of other halide compounds.

One object of the invention is to provide an improved flux of this kind which does not leave a corrosive residue, does not injure the skin, or emit disagreeable fumes or smoke.

Other objects of the invention are to provide an improved flux which, while possessing the above characteristics increases the spread of various solders, especially the lead silver solders on a given metal and will be applicable with a greater variety of metals.

The inventive features for the accomplishment of these and other objects are shown herein in connection with a flux which briefly stated, includes a combination of salts of two or more halogens in which the halogens are in their lowest states of oxidation.

Chloride salts, such as zinc chloride and ammonium chloride, if employed as fluxes either singly or together leave a corrosive residue on most metals. Other halide salts containing only one species of halogen radical, if they act as fluxes, likewise produce a substantially equally corrosive residue.

I have found that halide fluxes having more than one species of halide radical or anion present, leave substantially no corrosive residue. Moreover the spreading properties of such fluxes are greater than those of the usual fluxes when common metals are soldered with 50Pb-50Sn, 80Pb-20Sn, 95Pb-5Ag, or 97½Pb-2½Ag solders; and such mixed fluxes permit soldering of stainless steel which cannot be accomplished with the usual fluxes.

My flux comprises a relatively large proportion of halide salt or salts, preferably those which are capable of forming an aqueous solution having a pH value of less than 7, and/or which or may be decomposed at soldering temperatures to form corrosion dissolving or metal cleaning compounds; and a smaller proportion of a salt preferably of an alkali metal containing a different species of halide radical.

My combination of halides may be used as fluxes in the powder or paste form or in water solution, preferably having from 15% to 50% salts, or in solutions containing lower aliphatic alcohols having one, two, three or more hydroxyl groups such as ethyl alcohol, amyl alcohol, glycol or glycerine. Hydrochloric acid may be added to the solutions but I have found it unnecessary.

The reason for the effect of the halogens on each other in reducing corrosive residues and increasing spreading of the solders is unknown to me.

The halides and proportions thereof in my flux are as follows:

| | Per cent |
|---|---|
| Zinc chloride | 74.8 |
| Ammonium chloride | 19.3 |
| Sodium fluoride | .9 |
| Potassium bromide | 5.0 |

The salts next above were dissolved to form an aqueous solution of substantially 25% concentration.

My flux was tested for spread, tensil pull and corrosion.

RESULTS OF SPREAD TESTS

Tests were made to determine the flow of several solders on preheated surfaces of copper, yellow brass, 7-30 nickel copper, alloy mild steel, and 18:8 chromium-nickel steel when fluxed with my flux, and also with the Navy Dept. Spec. 51F1b grease base flux.

The following solders were used in this test:

| | |
|---|---|
| Lead-tin solder | 50–50 |
| Lead-tin solder | 80–20 tin N. D. Spec. 46S46 |
| Lead-silver solder | 95–5 |

Specimens of sheet materials 4-inches square by ⅛-inch thick maintained in the horizontal position were heated to 108° F. above the melting point of the solder. The temperature was controlled by means of a thermocouple attached to the underside of the plates at the center. The heated metal surfaces were fluxed and pellets of solder 0.1 cc. in volume were dropped on the preheated and fluxed surfaces. The solder was allowed to spread for 15 seconds after which the specimen was cooled in a blast of air. The area of spread was determined by means of a planimeter. Results are given in the following table:

| Material | Area of spread of solder in square inches | | | | | |
|---|---|---|---|---|---|---|
| | My flux | | | Flux of Navy Dept. Specification 51F1B | | |
| | 50-50 Pb-Sn solder 523° F. | 80-20 Pb-Sn solder 645° F. | 95-5 Pb-Ag solder 797° F. | 50-50 Pb-Sn solder 523° F. | 80-20 Pb-Sn solder 645° F. | 95-5 Pb-Ag solder 797° F. |
| Copper | .89 / .90 | 1.20 / 1.40 | .74 / .88 | .62 / .63 | 1.08 / 1.10 | (a) |
| Brass | .99 / 1.09 | .98 / 1.22 | .37 / .43 | .42 / .48 | .46 / .70 | (a) |
| 70-30 Ni-Cu | .42 / .55 | .72 / .73 | .22 / .36 | .30 / .36 | .31 / .49 | (a) |
| Mild steel | 1.46 / 1.74 | 1.55 / 1.89 | (a) | .50 / .52 | .75 / .87 | (a) |
| 18-8 Cr-Ni | .20 / .23 | .28 / .43 | (c) | (b) | (b) | (a) |

(a) Flux black and gummy, not workable.
(b) Flux does not work on this type of material.
(c) Solder not suitable for stainless steel.

Results of Tensil Pull for Copper Wires Soldered to Several Metals

A clean spot copper wire (0.0508 in diameter) was soldered to the center of several pieces of metal. The wire was parallel to the long dimension of the test piece and ½ inch of the wire was in contact with the test piece. Pieces so prepared were pulled to destruction in a tension testing machine. Failure of the wire outside the soldered joint was taken to be indicative of an acceptable flux, while failure of the solder joint was cause for rejection of the flux. Specimens prepared in this manner with my flux, and 50–50 lead-tin, 80–20 lead-tin solder, and 95–5 lead-silver solder on copper, brass and 70–30 nickel copper alloy failed outside the soldered joints. Samples of mild steel and 18–8 chromium-nickel steel also made good joints when assembled with 50–50 and 80–20 lead-tin solders and my flux.

Results of Corrosion Tests

Samples of copper, brass, 70–30 nickel-copper alloy and 18:8 chromium-nickel steel were fluxed with my flux and partly tinned with several solders. Samples were subjected to a normal salt spray, while others were dipped intermittently in Severn River water, a brackish estuary water. A third lot of samples were left exposed to the atmosphere. None of the samples showed any accelerated corrosion attack as a result of these trials.

My flux emitted no noticeable offensive or irritating fumes during the trials.

Quantitative spreading tests were carried out, which determine the degree of spreading of a standard size solder fillet on various basis metals under carefully controlled conditions.

My flux was compared with 25% aqueous solution of zinc chloride. Two solder alloys and two basis materials were employed, viz:

Basis Materials (a) Tin-mill blackplate: This was ordinary common substance pack-rolled, white annealed stock. The plate carried a brown-blue oxide film which was not removed prior to the test.

(b) Electrotinplate (from stannate bath): This was made from the same batch of tin-mill blackplate and carried an 8-oz. basis box (0.00003 in. thickness) tin electro-deposit.

Solders (a) Tin 40%, lead 60%.
(b) Lead 97.5%, silver 2.5%.

Fluxes (a) 25% solution of zinc chloride (technical).
(b) My flux.

Results

The figures quoted in the following table are average parameters of the spread droplet. A high figure indicates good spreading and good joint-forming capacity. Tests were carried out in quadruplicate.

| Solder | Flux | Basis material | |
|---|---|---|---|
| | | Black-plate | Electrotin-plate |
| Tin-lead 40–60 | $ZnCl_2$ | 15.5 | 23 |
| | My flux | 18.1 | 24.7 |
| Silver-lead 2½–97½ | $ZnCl_2$ | 12.1 | 16.4 |
| | My flux | 19 | 19.4 |

Still other tests showed my flux to give increased spreads on bronze and Monel metal of 130% and 100% respectively and show no accelerated corrosion under salt spray tests for 144 hours.

The invention claimed is:

A soldering flux comprising substantially 74.8% zinc chloride; 19.3% ammonium chloride; 0.9% sodium fluoride; and 5.0% potassium bromide.

OSKAR HOROWITZ.